(12) United States Patent
Hanson et al.

(10) Patent No.: US 11,070,289 B1
(45) Date of Patent: Jul. 20, 2021

(54) METHOD AND SYSTEM FOR LOCATION-BASED TRIGGERING OF REMOTE TESTING

(71) Applicant: Verizon Patent and Licensing Inc., Basking Ridge, NJ (US)

(72) Inventors: Michael D. Hanson, Braintree, MA (US); Robert R. Sheehan, Florham Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/887,935

(22) Filed: May 29, 2020

(51) Int. Cl.
*H04B 10/079* (2013.01)
*H04B 10/25* (2013.01)

(52) U.S. Cl.
CPC .......... *H04B 10/079* (2013.01); *H04B 10/25* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0279732 | A1* | 12/2006 | Wang | G01J 3/02 356/326 |
| 2008/0052583 | A1* | 2/2008 | Matteson | H04B 10/0773 714/734 |
| 2008/0151231 | A1* | 6/2008 | Peterson, Jr. | H04B 10/071 356/73.1 |
| 2009/0190921 | A1* | 7/2009 | Nakajima | G01M 11/3136 398/13 |
| 2009/0204237 | A1* | 8/2009 | Sustaeta | G05B 13/0285 700/36 |
| 2010/0284687 | A1* | 11/2010 | Tanzi | H04J 14/0298 398/1 |
| 2010/0322620 | A1* | 12/2010 | Wellbrock | H04B 10/038 398/18 |
| 2012/0236294 | A1* | 9/2012 | Smith | G01M 11/3154 356/73.1 |
| 2016/0356670 | A1* | 12/2016 | Brillhart | H04B 10/0731 |

* cited by examiner

*Primary Examiner* — Omar S Ismail

(57) ABSTRACT

A method, a device, and a non-transitory storage medium provide a location-based remote testing service. The location-based remote testing service may receive a request for a remote test that includes location information indicating a location subject to a remote test. The service may correlate the location information to a network element of a network. The service may perform a remote test on the network element. The service may provide a result of the remote test to a device that requests the remote test.

20 Claims, 9 Drawing Sheets

METHOD AND SYSTEM FOR LOCATION-BASED TRIGGERING OF REMOTE TESTING

BACKGROUND

Management of networks or facilities may relate to a multitude of factors, such as architecture, provisioning, resource modeling, fault supervision, assurance and performance management, trace management, and other types of supervisory and management-related factors.

DETAILED DESCRIPTION OF PREFERRED EMBODIMENTS

Figure 1:
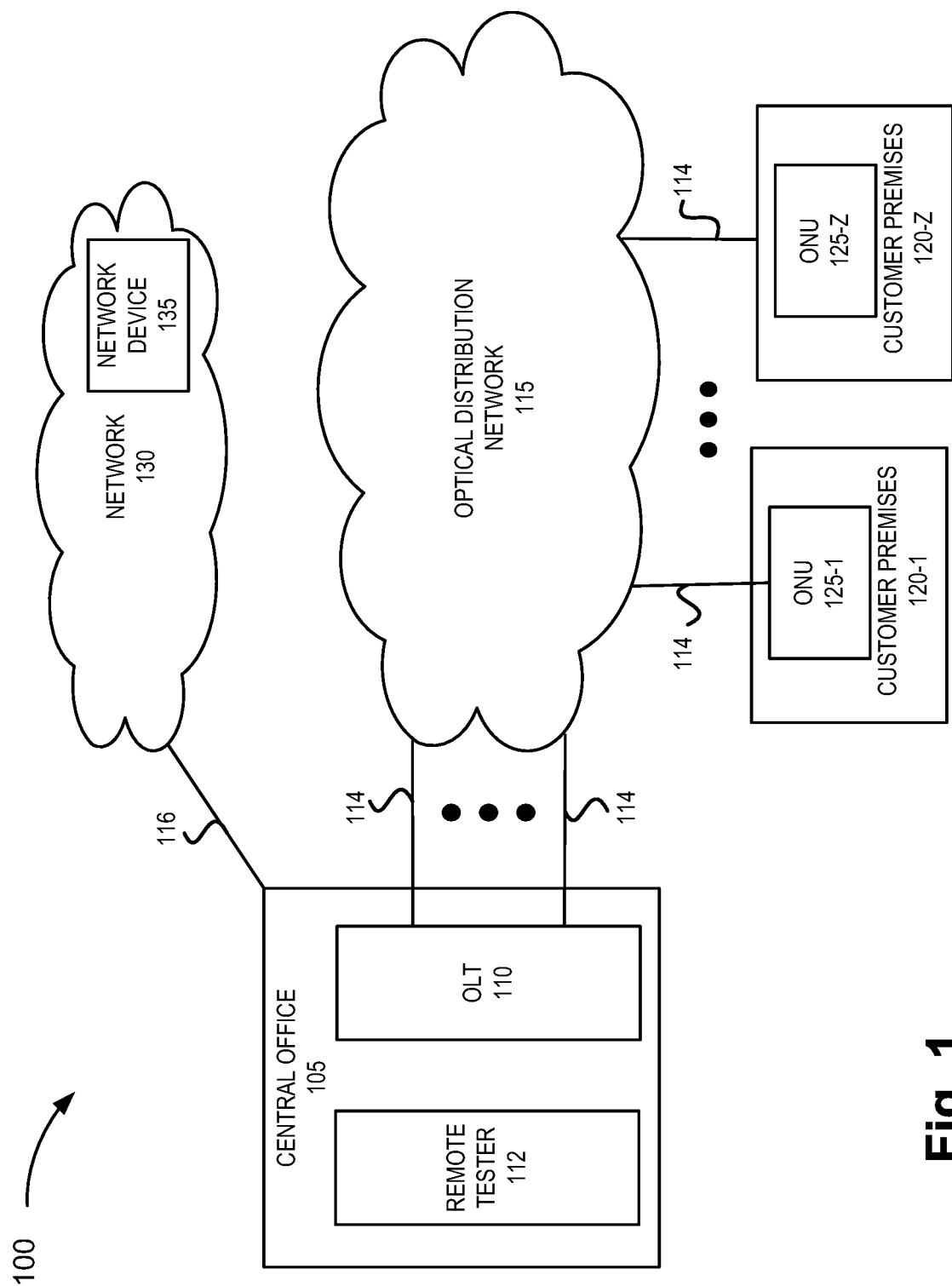
FIG. 1 is a diagram illustrating an exemplary environment in which an exemplary embodiment of a location-based remote testing service may be implemented.

The following detailed description refers to the accompanying drawings. The same reference numbers in different drawings may identify the same or similar elements. Also, the following detailed description does not limit the invention.

The provisioning of a service may include various types of network elements. For example, the network elements may include a plant, a facility, equipment, a device, a communication link (e.g., a cable, a wire, an optical fiber, etc.), an element (e.g., a circuit, a pathway, a virtual element, a logical element, etc.), or another type of constituent of an infrastructure, a network, or another type of architecture. The ability to remotely test various types of network elements is essential for service providers and other entities to effectively provide service assurance to customers or end users. Any enhancement that may add to the efficiency with which testing, isolating, and correcting service affecting issues of a network element becomes a valuable tool to provide services.

There are various approaches for isolating an issue pertaining to a service. For example, a person (e.g., a service technician or other personnel) may troubleshoot the issue by accessing the network element directly using a device. The person may measure a characteristic of the network element via the device which may assist in the isolation of a fault in the network element. According to another example, the person may trigger a remote test of the network element using an identifier of the network element or an identifier of a service associated with a customer that has been impacted. The results of the remote test may assist the person in identifying the root cause of the issue.

Typically, the ability to remotely test a network element depends on knowing an identifier associated with the network element, a service (e.g., a circuit identifier, a path identifier, etc.), and/or a customer. For example, the person may remotely test an end device of a customer (e.g., an optical network unit (ONU)). However, there may be circumstances when a customer (e.g., a service provider) may use their own network elements (e.g., end device, optical devices, etc.) while using other network elements (e.g., optical fiber) of a network provider's optical network. Such circumstances present challenges in the ability to remotely test for such a customer.

According to exemplary embodiments, a location-based remote testing service is provided. According to an exemplary embodiment, the location-based remote testing service may enable remote testing based on geolocation information of a network element. According to an exemplary embodiment, the location-based remote testing service may include an inventory system that correlates network elements to geolocation information. According to an exemplary embodiment, a remote testing system may use the inventory information to perform a remote test on network elements of relevance. In this way, a remote test of a network element may be triggered and performed based solely on the geolocation of the network element without the requirement of an identifier, or alternatively, a person directly accessing the network element on site.

FIG. 1 is a diagram illustrating an exemplary environment 100 in which an exemplary embodiment of a location-based remote testing service may be implemented. As illustrated, environment 100 may include a central office 105. Central office 105 may be a distribution node of a service provider. Central office 105 may host an optical line terminal (OLT) 110 and a remote tester 112, as illustrated. Central office 105 may include other elements not illustrated (e.g., an optical distribution frame (ODF), etc.), and may or may not include core network equipment. For example, the core network equipment may include television provider equipment, Internet provider equipment, and/or telephone provider equipment (e.g., packet-switched, etc.). Central office 105 may also provide electrical power. Central office 105 may provide a service to customer premises 120. According to other exemplary embodiments, a site different from a central office 105 may host OLT 110 and/or remote tester 112.

OLT 110 includes an optical device that may perform various functions, such as traffic scheduling, buffer controlling, and bandwidth allocating. OLT 110 may be implemented as an optical blade or card associated with optical signals that may be communicated to customer premises 120 via optical distribution network (ODN) 115 via optical fibers 114. Optical fibers 114 may include single mode and/or multimode optical fibers. Optical fibers 114 may include, for example, gratings (e.g., Bragg gratings) that enable remote testing, as described herein.

Remote tester 112 may provide the location-based remote testing service, as described herein. According to an exemplary embodiment, remote tester 112 may include a distributed fiber optic sensing system that provides fiber optic sensing. For example, remote tester 112 may connect an opto-electronic interrogator to an optical fiber (or cable) to enable detection of issues along the optical fiber. Remote tester 112 may detect a break or a bend in the fiber, a bad splice, or other types of abnormalities based on the backscattering of light. Remote tester 112 may determine a location of the fault or the condition along the optical fiber, for example.

According to an exemplary embodiment, remote tester 112 may perform a remote test based on the look-up service of network device 135, as described herein. For example, remote tester 112 may receive a test request that includes geolocation information relating to the look-up service, as described herein. Remote tester 112 may perform a test that is to an intermediary network element (e.g., an optical fiber, a pole, or another network element) and not to an end point device (e.g., ONU 125) based on the geolocation information associated with the intermediary network element. Remote tester 112 may provide a test response to a device from which the test request is initiated, as described herein. Central office 105 and/or remote tester 11 may communicate with network device 135 via network 130 and a communication link 116. Communication link 116 may be a wireless, wired, or optical communication link.

Additionally, environment 100 includes an optical distribution network (ODN) 115. ODN 115 includes an optical network that provides an optical transmission medium for the connection between OLT 110 and optical network units (ONUs) 125. Although not illustrated, ODN 115 may include optical fibers, fiber optic connectors, optical splitters/combiners, attenuators, modulators, and other optical components. According to some exemplary implementations, ODN 115 may include a passive optical distribution network, in that no amplification, powered optical splitting, or active filtering is used to transmit signals across ODN 115. According to other exemplary implementations, ODN 115 may include additional network components associated with an active optical network such as optical amplifiers, switches, multiplexers, and/or other network devices.

Customer premises 120 may include a multi-dwelling unit or a single dwelling unit. A multi-dwelling unit may include, for example, apartments, offices, condominiums, and/or other types of units that may be aggregated in a high-rise or another type of building. A single dwelling unit may include attached town houses, single detached houses, condominiums, and/or other types of horizontally aggregated occupancy units. Customer premises 120 may include one or more ONUs 122.

ONU 125 may include an optical device that provides network-side line termination and user-side line termination functions. For example, ONU 125 may perform various functions, such as converting an optical signal to an electrical signal and multiplexing and de-multiplexing. ONU 125 may be connected to various end devices or user devices (not illustrated). For example, the end devices or user devices may provide access to various services, such as a television service, a telephone service, an Internet service, and/or some other type of service.

Network 130 may include one or multiple networks of one or multiple types and technologies. For example, network 130 may include a wireless network, such as a radio access network (RAN) (e.g., Fifth Generation (5G) RAN, Fourth Generation (4G) RAN, etc.), a core network (e.g., 5G core network, 4G core network, etc.). Network 130 may also include a wired network, an optical network, a network provider network, a service provider network, the Internet, the Web, a multi-access edge computing (MEC) network, a data center, a cloud network, a packet-switched network, an application layer network, a virtualized network, and/or another type of network. Network 130 may include a network device 135, as described herein.

Network device 135 may provide the location-based remote testing service. According to an exemplary embodiment, network device 135 includes an inventory system pertaining to central office 105, ODN 115, ONUs 125, and/or remote tester 112. According to other exemplary embodiments, the inventory system may pertain to other types of network devices.

According to an exemplary embodiment, the inventory system may include geolocation information that are correlated to network elements. For example, a pole that supports an optical fiber and/or an optical fiber that runs between two poles of ODN 115 may be correlated to geolocation information. The geolocation information may be implemented as geographic coordinates (e.g., latitude and longitude) or another form of location information (e.g., a street address, a service area identifier, etc.). The location-based remote testing service may include a look-up service that supports location-based remote testing of a network element, as described herein. Network device 135 may include an operations support system (OSS) or a business support system (BSS).

The type, the number, and the arrangement of devices in environment 100 are exemplary. According to other embodiments, environment 100 may include additional devices, fewer devices, and/or differently arranged devices, than those illustrated in FIG. 1. For example, according to other exemplary embodiments, environment 100 may not include central office 105 or remote tester 112 and/or OLT 110 may not be included in central office 105. According to other exemplary embodiments, multiple network devices may be combined into a single network device. For example, network device 135 and remote tester 112 may be combined. Additionally, or alternatively, a single network device may be implemented as multiple network devices in which a process or a function may be collaboratively performed or multiple processes or functions may be split between them. Other variations of environment 100 may be implemented. Additionally, the type, the number, and the arrangement of communication links are exemplary.

Figure 2A:
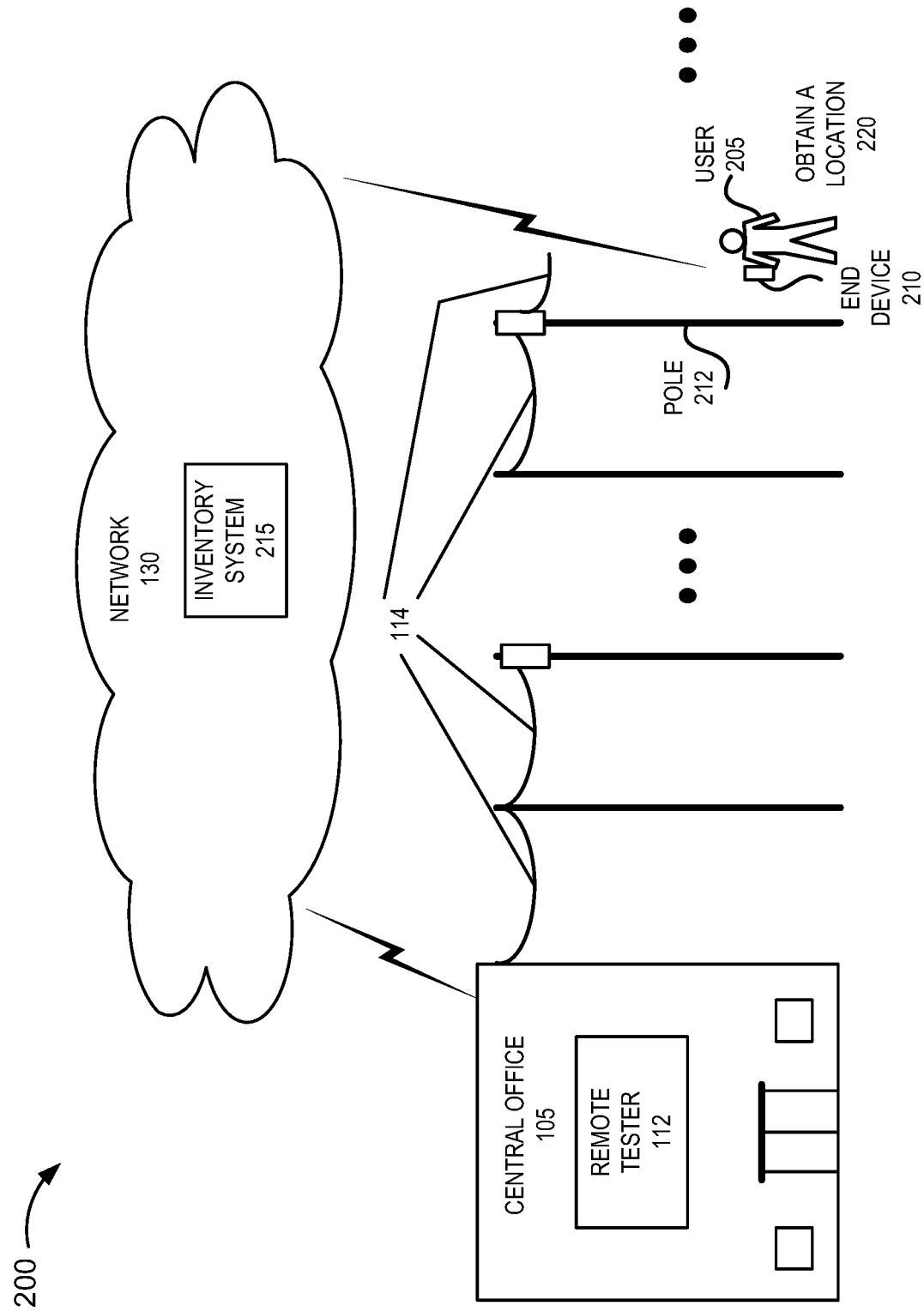
FIGS. 2A-2E are diagrams illustrating an exemplary process of the location-based remote testing service according to an exemplary scenario.

FIGS. 2A-2E are diagrams illustrating an exemplary process 200 of the location-based remote testing service. Referring to FIG. 2A, according to an exemplary scenario, assume that a service problem is reported to a network provider. Process 200 may include obtaining a location 220. For example, a user 205 (e.g., a technician) with an end device 210 (e.g., a mobile device or a portable device) may be dispatched to resolve the service problem. User 205 may identify a location to which network elements of the location may be remotely tested. For example, end device 210 may include an application that acquires a location (e.g., Global Positioning System (GPS) coordinates or other location information) or permits user 205 to enter a location (e.g., a street address or other location information). According to this exemplary scenario, the location may be associated with a pole 212, a fiber hub, an access point, optical fiber 114, and/or any other network element or facility in the provider's network.

Figure 2B:
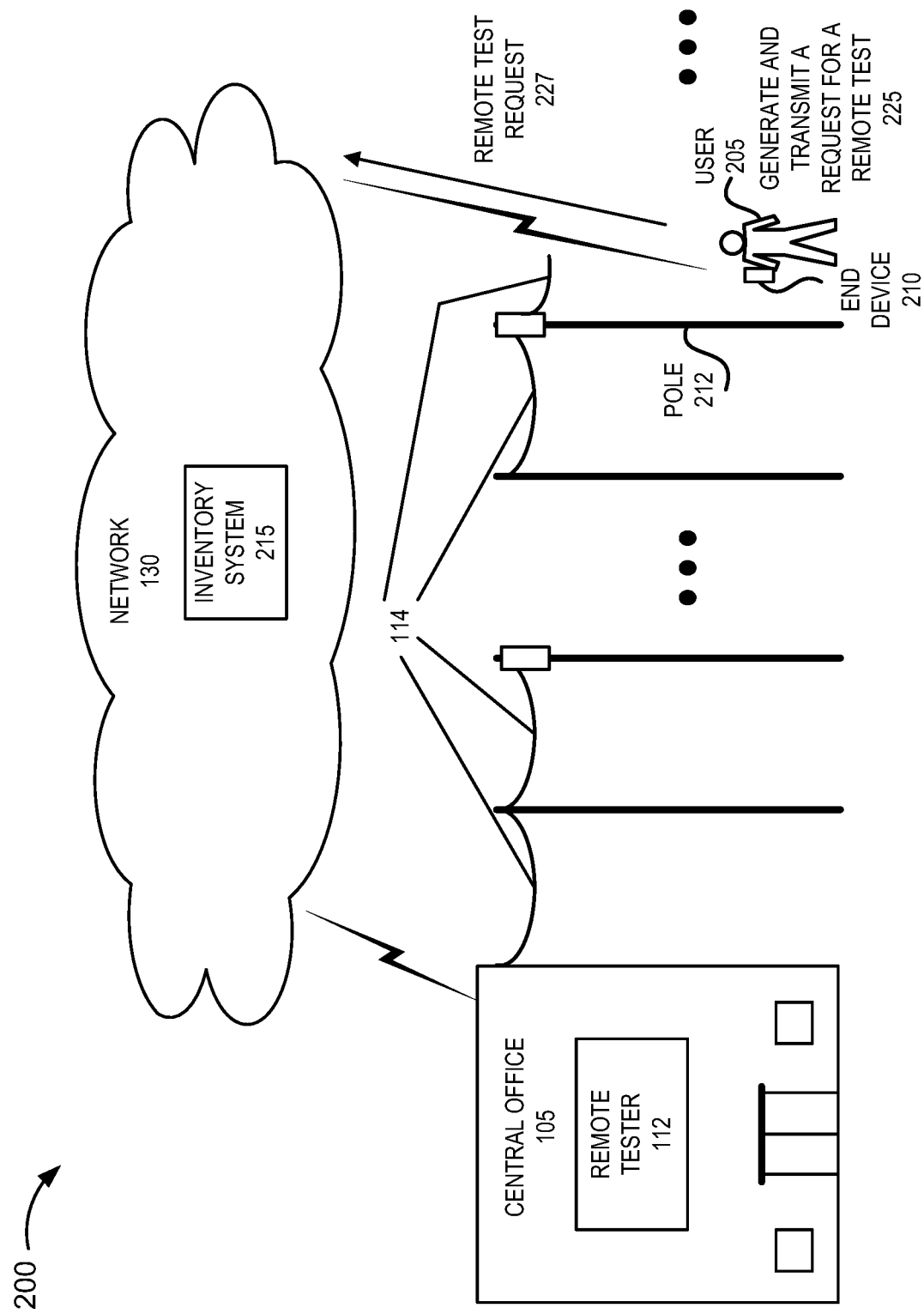

Referring to FIG. 2B, process 200 may include generating and transmitting a request for a remote test 225. For example, end device 210 may generate a remote test request. The remote request includes the location information. The remote request may include other parameters for the remote test, such as the network element to be tested (e.g., optical fiber) and/or the type of test to be performed. The parameter may be provided by user 205 or pre-configured in the application. End device 210 may wirelessly transmit a remote test request 227 to inventory system 215 via network 130.

Figure 2C:
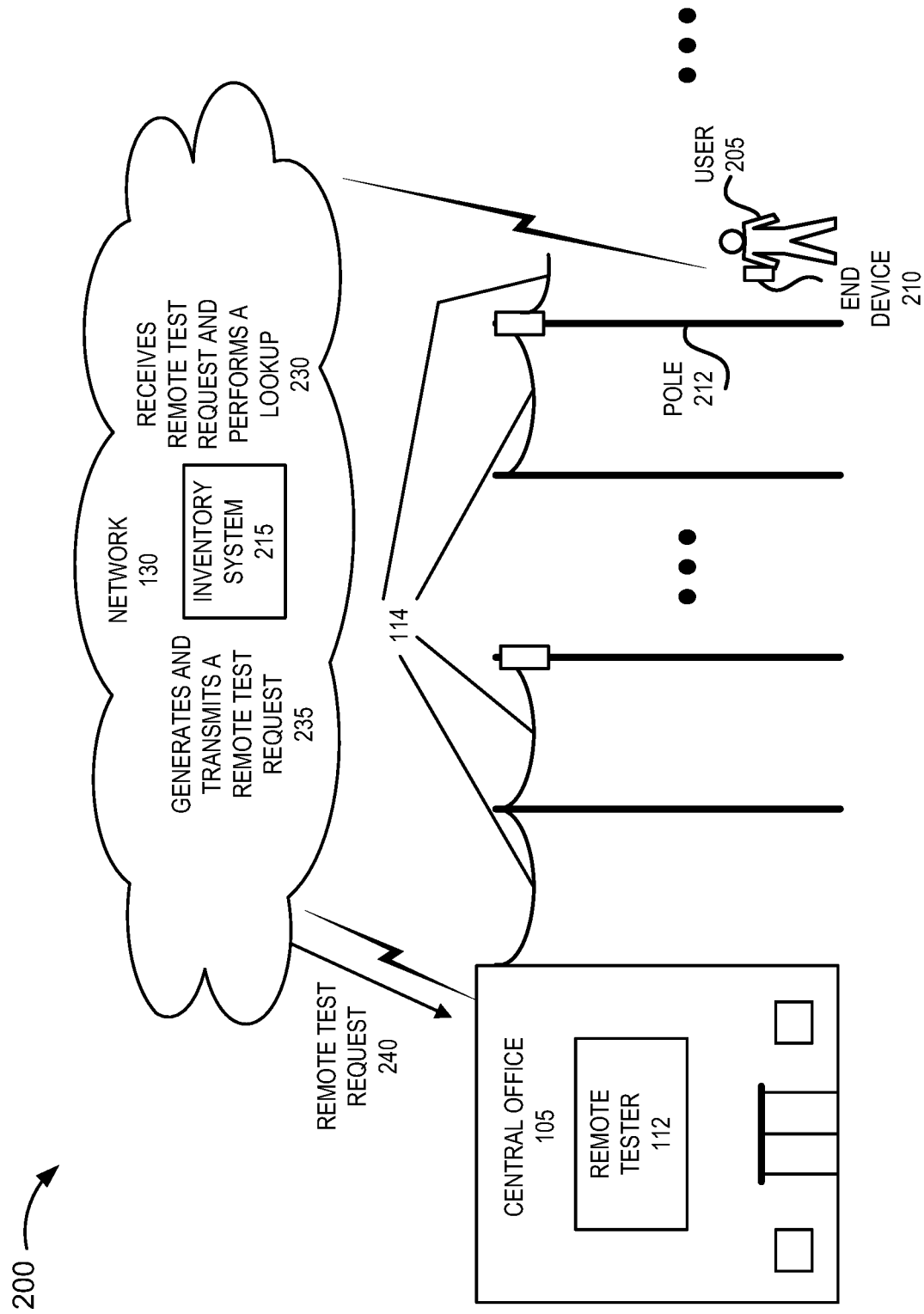
Figure 3:
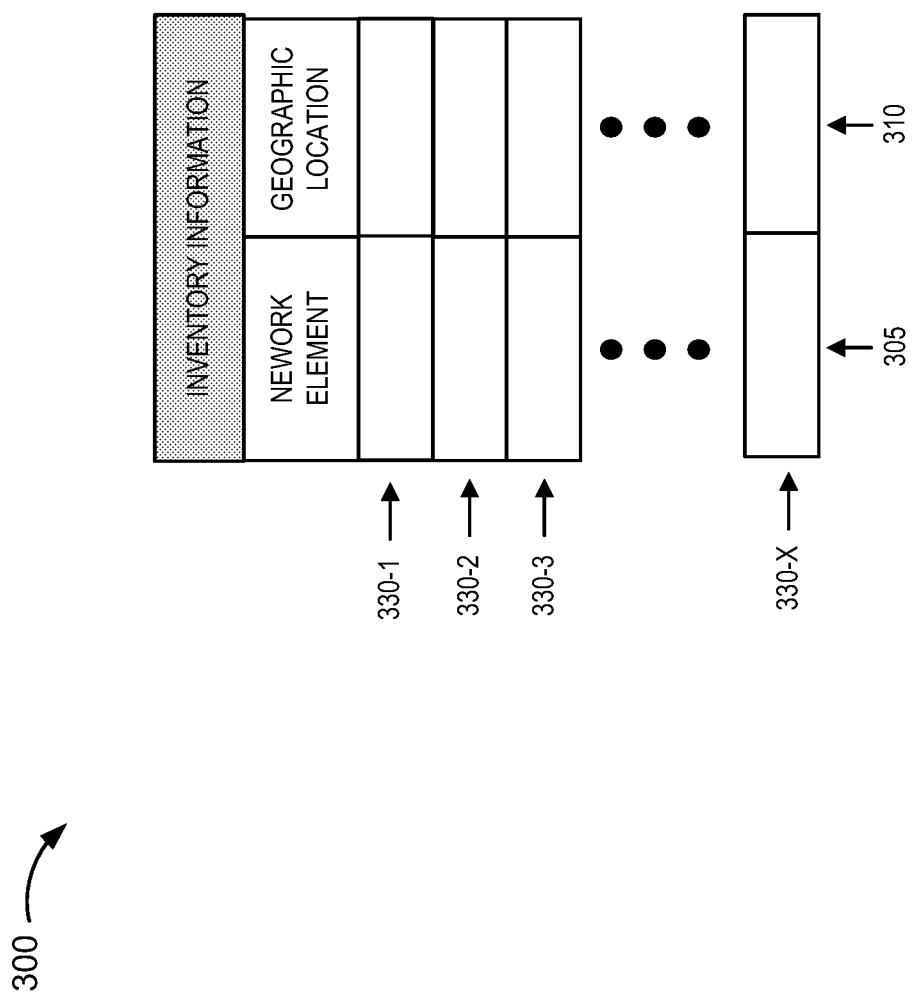
FIG. 3 is a diagram illustrating exemplary inventory information.

Referring to FIG. 2C, process 200 may include receiving the remote test request and performing a lookup 230. For example, inventory system 215 may receive remote test request 227 and perform a lookup 230. As previously described, according to an exemplary embodiment, the location-based remote testing service includes inventory information. For example, referring to a table 300 in FIG. 3, exemplary inventory information is illustrated. According to an exemplary embodiment, the inventory information may be stored by or accessible by network device 135 (e.g., inventory system 215). Table 300 may include a network element field 305 and a geographic location field 310. As further illustrated, table 300 includes entries 330-1 through 330-X (also referred as entries 330, or individually or generally as entry 330) that each includes a grouping of fields 305 and 310 that are correlated (e.g., a record, etc.). The inventory information is illustrated in tabular form merely for the sake of description. In this regard, the inventory information may be implemented in a data structure different from a table (e.g., a list, a flat file, etc.), a database, or other type of data file.

Network element field 305 may store a type of network element. For example, network element field 305 may store information indicating an optical fiber or another type of network element (e.g., an optical network device, a circuit, a facility, etc.). Additionally, or alternatively, network element field 305 may store an identifier of the network element. For example, the identifier may uniquely identify the optical fiber or other type of network element.

Geographic location field 310 may store location information. For example, the location information may be geographic coordinates (e.g., latitude/longitude values, and optionally an elevation value) of a geographic coordinate system (GCS), coordinate values associated with another type of coordinate system (e.g., a projected coordinate system (PCS), etc.), or other types of geographic location information (e.g., a street address of a city or town, etc.).

According to other exemplary implementations, table 300 may store additional, fewer, and/or different instances of inventory information in support of the location-based remote testing service, as described herein. For example, inventory information may correlate other information, such as a central office 105 or a remote tester 112.

Referring to FIG. 2C, based on the inventory information and remote test request 227, inventory system 215 may perform the lookup based on matching the location information included in remote test request 227 with the inventory information (e.g., geographic location field 310). Based on the lookup, inventory system 215 or another system (e.g., an OSS, a BSS, or similar system) may generate and transmit a remote test request 235 to an appropriate remote tester 112. The appropriate remote tester 112 may be, for example, a remote tester 112 that is closest to the location of relevance and/or a remote tester 112 that may be assigned to remotely test the network element of the location. A remote test request 240 may include the location of the network element to be remotely tested. Remote test request 240 may or may not specify the network element to be tested and/or other parameters (e.g., type of remote test, etc.), as described herein. According to various exemplary scenarios, remote test request 240 may indicate to remotely test one or multiple optical fibers, one or multiple circuits, routers, switches, or other types of network elements that may be situated at or proximate to the location.

Figure 2D:
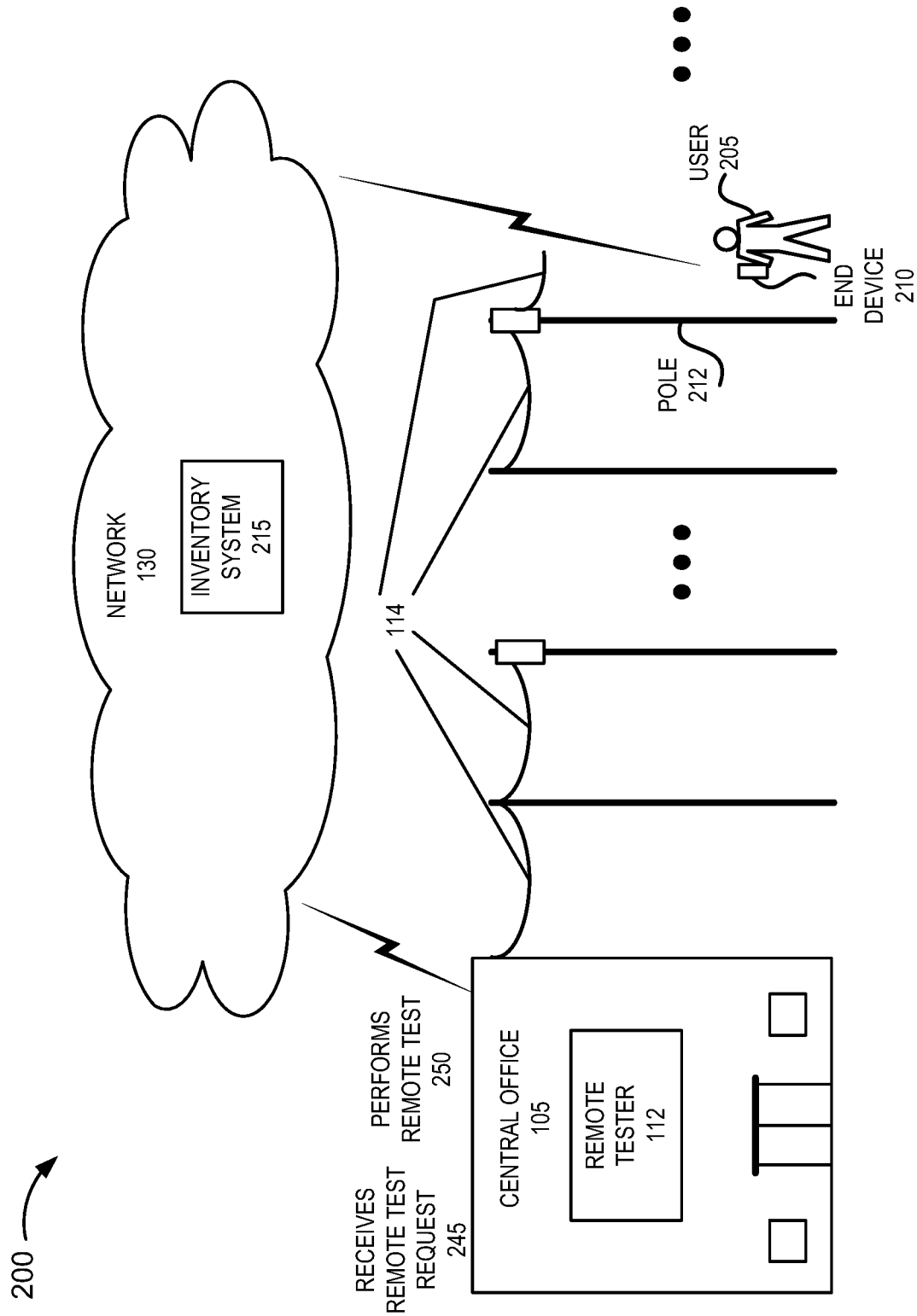

Referring to FIG. 2D, process 200 may include receiving the remote test request 245 and performing a remote test 250. For example, remote tester 112 may receive remote test request 240. Remote tester 112 may interpret the information included in the remote test request and perform a test. For example, remote tester 112 may test an optical fiber and/or other type of optical network element that may be remotely located at the given location.

By way of further example, remote tester 112 may use the geolocation-based inventory system to identify an optical fiber that travels past that geolocation and may run an optical diagnostic test on that specific fiber to identify any faults in the path of the fiber between remote tester 112 and the location. According to another example, remote tester 112 may use the geolocation-based inventory system to identify an ONU and/or an ONT located at or near the same geolocation as provided to initiate the test, and may run a diagnostic test to test that equipment and identify any faults or issues in the access medium between network element in the office and the equipment. Remote tester 112 may perform one or multiple tests, such as an optical time domain reflectometer test, an advanced distributed fiber sensing test, or other types of tests relating to optical fiber or other types of network elements.

Figure 2E:
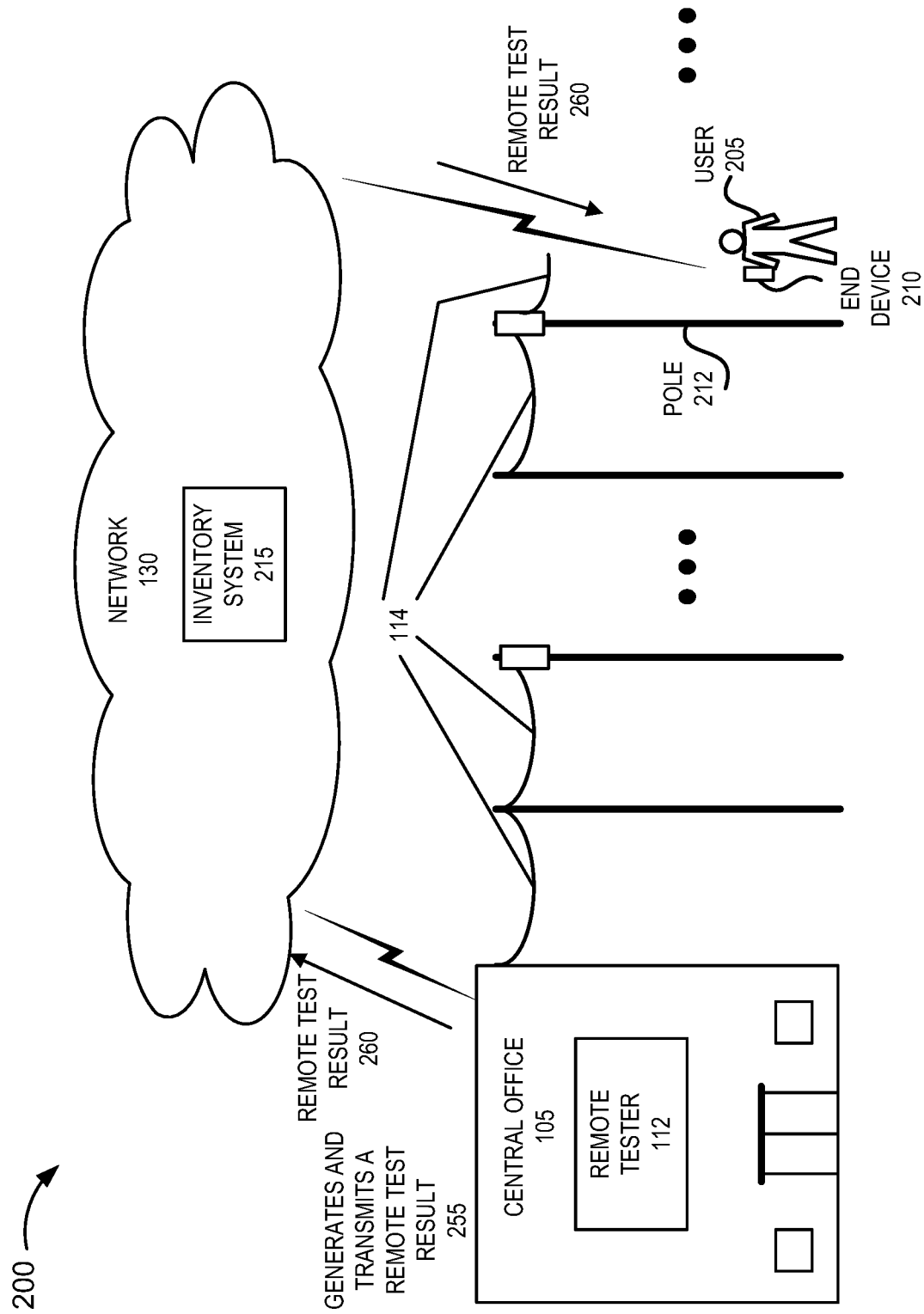

Referring to FIG. 2E, remote tester 112 may generate and transmit a remote test result 255 to end device 210 via network 130. A remote test result 260 may or may not identify a fault or an issue relating to the tested optical fiber and/or other optical network element and the reported service problem. Remote test result 260 may also indicate a fault location to user 205 for repair.

Although FIGS. 2A-2E illustrate an exemplary embodiment of a process of the location-based remote testing service, according to other exemplary scenarios, the location-based remote testing service may perform additional operations, fewer operations, and/or different operations than those illustrated and described. For example, according to other exemplary scenarios, a network element subject to the location-based remote testing service may not be optical fiber. For example, the network element may be an optical device of ODN 115. Additionally, or alternatively, the optical fiber or other type of network element may not be above ground.

According to other exemplary embodiments, unlike the exemplary scenario described, user 205 may not need to be dispatched to a location (e.g., which may be proximate to a locale associated with a service issue). For example, a location proximate to a location of a service problem may be obtained based on the location of the service problem or customer. By way of further example, a distance from or an area adjacent to the customer may be selected. According to such an exemplary embodiment, user 205 may be situated in a call center or other type of facility associated with a network provider, a service provider, or other type of entity. Additionally, for example, the location-based remote testing service may include an automated system that actively monitors any issues in the network, and such automated system may invoke a remote test relative to a location of relevance relating to the issue.

According to other exemplary scenarios, the location-based remote testing service may be used for situations that may not be responsive to reported service issues (e.g., by customers, etc.) but related to routine maintenance or other types of network management activities.

Figure 4:
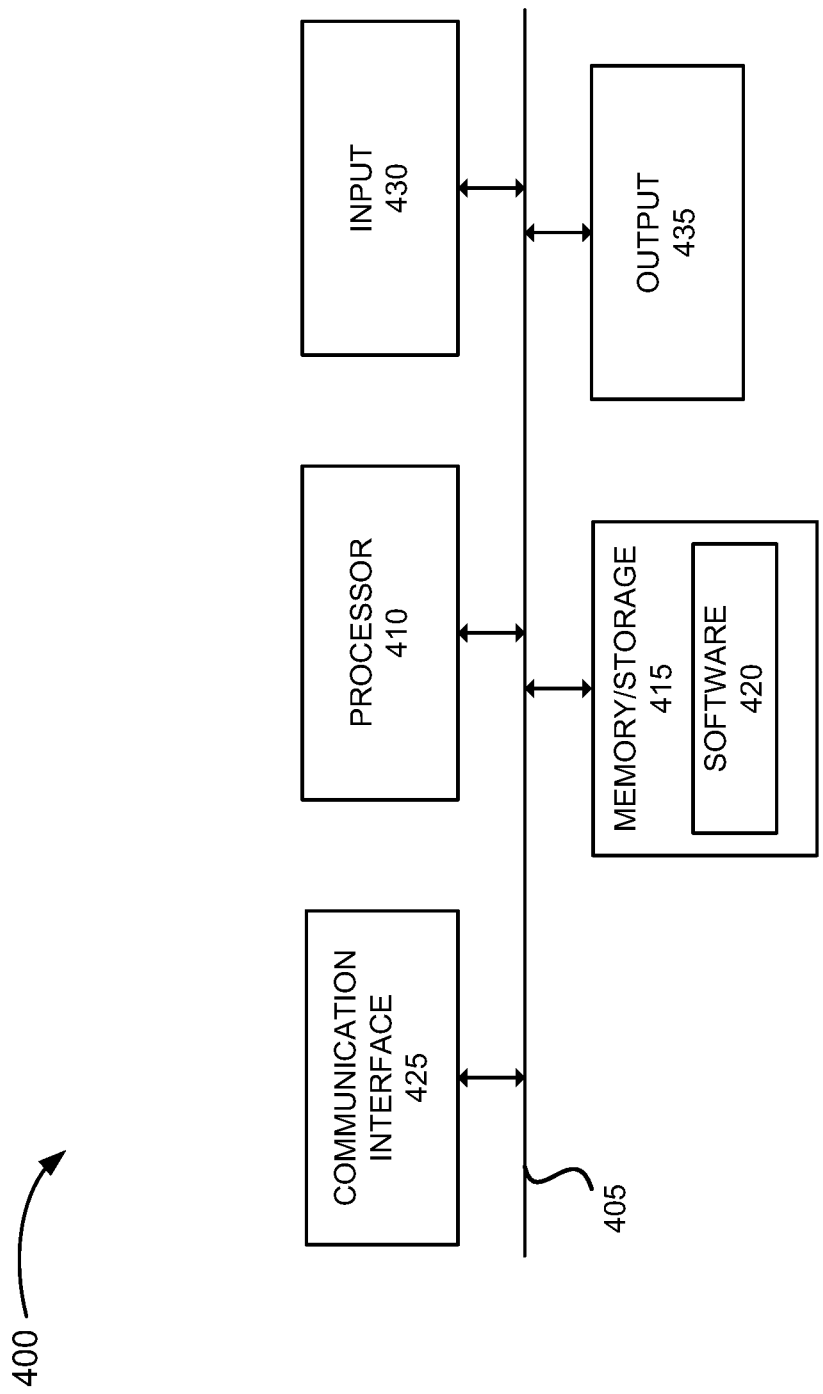
FIG. 4 is a diagram illustrating exemplary components of a device that may correspond to one or more of the devices illustrated herein.

FIG. 4 is a diagram illustrating exemplary components of a device 400 that may correspond to one or more of the devices described herein. For example, device 400 may correspond to remote tester 112, network device 135, end device 210, and/or inventory system 215, and other types of network devices or logic, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein. For example, remote tester 112 may include an optical component (e.g., a laser source, an interferometer, etc.) and/or other components of a distributed fiber optic sensing system.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.) and may include one or multiple memories (e.g., cache, etc.). Processor 410 may include a dedicated element (e.g., a dedicated microprocessor) and/or a non-dedicated element (e.g., a non-dedicated/shared microprocessor, etc.).

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 415 may include a hard disk (e.g., a magnetic disk, an optical disk, a magneto-optic disk, a solid state disk, etc.), and/or a nanotechnology-based storage medium. Memory/storage 415 may include a drive for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. Software 420 may also include firmware, middleware, microcode, hardware description language (HDL), and/or other form of instructions. As an example, with reference to network device 135 or inventory system 215, software 420 may include an application that, when executed by processor 410, provides the lookup service, as described herein. According to another example, with reference to end device 210, software 420 may include an application that, when executed by processor 410, allows a user to generate and transmit a remote test request and receive a remote test result. The software 420 may also obtain location information of end device 210. According to yet another example, with reference to remote tester 112, software 420 may include an application that, when executed by processor 410, provides the remote testing service, as described herein. For example, remote tester 112 may perform remote testing of optical fiber associated with the location information.

Communication interface 425 permits device 400 to communicate with other devices, networks, systems, and/or the like. Communication interface 425 includes one or multiple interfaces of one or multiple types (e.g., optical, wireless, wired). Communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, etc.).

Input 430 permits an input into device 400. For example, input 430 may include a keyboard, a mouse, a display, a touchscreen, a touchless screen, a button (e.g., a power button, a disaster recovery button, a virtual button, etc.), a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
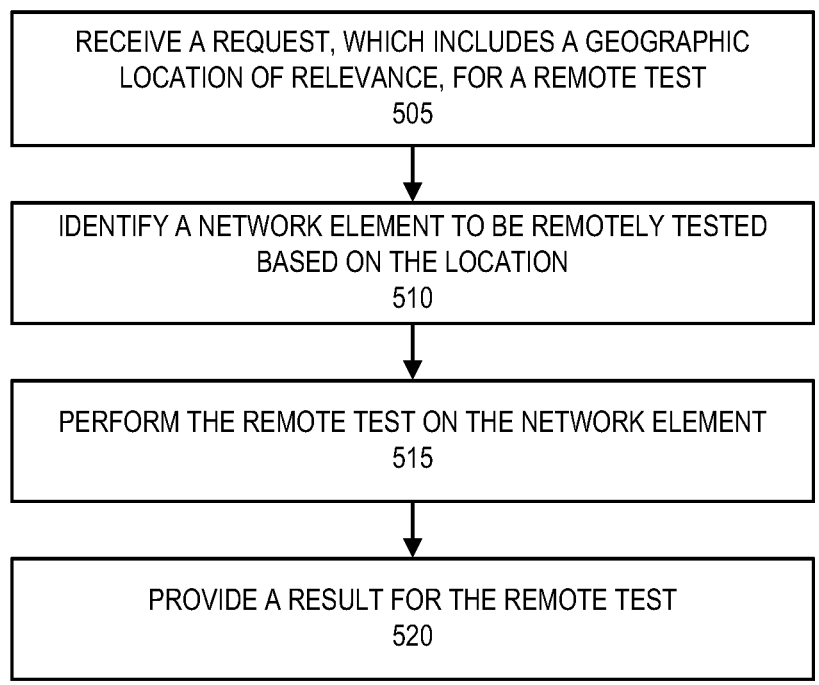
FIG. 5 is a flow diagram illustrating an exemplary process of the location-based remote testing service.

FIG. 5 is a flow diagram illustrating an exemplary process 500 of the location-based remote testing service. According to an exemplary embodiment, network device 135 and remote tester 112 performs steps of process 500. For example, processor 410 may execute software 420 to perform a step illustrated in FIG. 5 and described herein. Alternatively, a step illustrated in FIG. 5 and described herein, may be performed by execution of only hardware. Further, a step may be only partially performed by the execution of software 420 or only hardware.

Referring to FIG. 5, in block 505, process 500 may include receiving a request, which includes a geographic location of relevance, for a remote test. For example, network device 135 may receive a request that includes location information at which a network element may be subject to a remote test.

In block 510, a network element that is subject to the remote test may be identified. For example, network device 135 may correlate via an inventory system, the network element that correlates to the location information included in the request.

In block 515, the remote test on the network element is performed. For example, network device 135 may provide a request to remote tester 112. The request may include the location information and the network element subject to the remote test. Remote tester 112 may perform the remote test on the network element based on the request.

In block 520, a result of the remote test may be provided. For example, remote tester 112 may provide the result of the remote test to a requesting device. For example, a user that initiated the remote test may receive the result. When an issue is detected, the result may identify the issue or the fault and a location in the network.

FIG. 5 illustrate an exemplary process 500 of the location-based remote testing service, however, according to other embodiments, process 500 may include additional operations, fewer operations, and/or different operations than those illustrated in FIG. 5 and described herein.

The foregoing description of embodiments provides illustration but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive.

In addition, while a series of blocks has been described with regard to the process illustrated in FIG. 5, the order of the blocks may be modified according to other embodiments. Further, non-dependent blocks may be performed in parallel. Additionally, other processes and/or operations described in this description may be modified and/or non-dependent operations may be performed in parallel.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction described in this description should be construed as critical or essential to the embodiments described herein unless explicitly described as such.

All structural and functional equivalents to the elements of the various aspects set forth in this disclosure that are known or later come to be known are expressly incorporated herein by reference and are intended to be encompassed by the claims.

What is claimed is:

1. A method comprising: receiving, by a network device, a request for a remote test, wherein the request includes only location information indicating a location subject to the remote test; correlating, by the network device based on inventory information that includes network elements of the network correlated to different locations, the location information with a network element of a network, wherein the network elements include the network element; selecting, by the network device based on the correlating, the network element to be subject to the remote test; and performing, by the network device, the remote test of the network element based on the location information and the network element.

2. The method of claim 1, wherein the network element is at least one of an optical fiber or an optical network device.

3. The method of claim 1, wherein the selecting comprises: storing, by the network device, the inventory information.

4. The method of claim 1, wherein the remote test includes a distributed fiber optic sensing test.

5. The method of claim 1, wherein the location is not a customer premises.

6. The method of claim 1, wherein the location information includes longitude and latitude values.

7. The method of claim 1, wherein the request is received from an end device at the location.

8. The method of claim 1, further comprising: providing, by the network device after the performing, a result of the remote test to a device that requested the remote test.

9. A network device comprising: a processor, wherein the processor is configured to: receive a request for a remote test, wherein the request includes only location information indicating a location subject to the remote test; correlate, based on inventory information that includes network elements of the network correlated to different locations, the location information with a network element of a network, wherein the network elements include the network element; select, based on the correlation, the network element to be subject to the remote test; and perform the remote test of the network element based on the location information and the network element.

10. The network device of claim 9, wherein the network element is at least one of an optical fiber or an optical network device.

11. The network device of claim 9, wherein the processor is further configured to: store the inventory information.

12. The network device of claim 9, wherein the remote test includes a distributed fiber optic sensing test.

13. The network device of claim 9, wherein the location is not a customer premises.

14. The network device of claim 9, wherein the request is received from an end device at the location.

15. The network device of claim 9, wherein the processor is further configured to: provide, after the performance, a result of the remote test to a device that requested the remote test.

16. A non-transitory, computer-readable storage medium storing instructions executable by a processor of a device, which when executed cause the device to: receive a request for a remote test, wherein the request includes only location information indicating a location subject to the remote test; correlate, based on inventory information that includes network elements of the network correlated to different locations, the location information with a network element of a network, wherein the network elements include the network element; select, based on the correlation, the network element to be subject to the remote test; and perform the remote test of the network element based on the location information and the network element.

17. The non-transitory, computer-readable storage medium of claim 16, wherein the instructions further comprise instructions, which when executed cause the device to: store the inventory information.

18. The non-transitory, computer-readable storage medium of claim 16, wherein the network element is at least one of an optical fiber or an optical network device.

19. The non-transitory, computer-readable storage medium of claim 16, wherein the remote test includes a distributed fiber optic sensing test.

20. The non-transitory, computer-readable storage medium of claim 16, wherein the location is not a customer premises.

\* \* \* \* \*